(12) United States Patent
Hwang

(10) Patent No.: US 7,921,492 B2
(45) Date of Patent: Apr. 12, 2011

(54) METHOD OF CONTROLLING LAUNDRY TREATMENT MACHINE

(75) Inventor: Sang Il Hwang, Changwon-si (KR)

(73) Assignee: LG Electronics Inc., Seoul (KR)

( * ) Notice: Subject to any disclaimer, the term of this patent is extended or adjusted under 35 U.S.C. 154(b) by 449 days.

(21) Appl. No.: 11/931,596

(22) Filed: Oct. 31, 2007

(65) Prior Publication Data

US 2008/0104770 A1    May 8, 2008

(30) Foreign Application Priority Data

Nov. 3, 2006    (KR) .................. 10-2006-0108332

(51) Int. Cl.
*D06F 35/00* (2006.01)
(52) U.S. Cl. .......................................... 8/158
(58) Field of Classification Search ............... 8/158
See application file for complete search history.

(56) References Cited

U.S. PATENT DOCUMENTS

| | | | |
|---|---|---|---|
| 3,747,645 A * | 7/1973 | Holster et al. ........... | 137/838 |
| 5,870,905 A * | 2/1999 | Imamura et al. ........ | 68/12.04 |
| 2004/0103069 A1 | 5/2004 | Lee | |
| 2004/0194514 A1 * | 10/2004 | No et al. ................. | 68/24 |
| 2006/0000031 A1 * | 1/2006 | Hoppe ..................... | 8/159 |
| 2006/0080787 A1 * | 4/2006 | Choi ........................ | 8/148 |

FOREIGN PATENT DOCUMENTS

JP    05-309194    11/1993

OTHER PUBLICATIONS

German Office Action issued in German Patent Application No. 10 2007 052 184.9-26 dated Aug. 24, 2010 (full English translation).

* cited by examiner

*Primary Examiner* — Michael Barr
*Assistant Examiner* — Samuel A Waldbaum
(74) *Attorney, Agent, or Firm* — KED & Associates, LLP

(57) ABSTRACT

A method of controlling a laundry treatment machine is provided in which a siphon phenomenon may be detected before performing a requested laundry treatment operation by performing an intermittent water supply operation and detecting a variation, if any, in a water level in a tub of a washing machine. Such a method may prevent was water form being discharged due to a siphon phenomenon, prevent the waste of wash water, and minimize the amount of time taken to discharge wash water and perform a washing operation. Such a method may also prevent the waste of detergent by using a water supply valve for a pre-washing operation to detect the siphon phenomenon. Such a method may also prevent a water supply failure from being mistaken as a siphon phenomenon by keeping a water supply valve open for a predefined amount of time and then detecting a variation, if any, in the water level in the tub.

11 Claims, 2 Drawing Sheets

METHOD OF CONTROLLING LAUNDRY TREATMENT MACHINE

This application claims priority from Korean Patent Application No. 10-2006-0108332 filed on Nov. 3, 2006 in the Korean Intellectual Property Office, the disclosure of which is incorporated herein by reference in its entirety.

BACKGROUND OF THE INVENTION

1. Field of the Invention

The present invention relates to a method of controlling a laundry treatment machine, and more particularly, to a method of controlling a laundry treatment machine in which the waste of wash water and wash time caused by a siphon phenomenon can be minimized by detecting the siphon phenomenon before performing an operation requested by a user.

2. Description of the Related Art

In general, laundry treatment machines are broadly classified into washing machines which remove dirt and dust from laundry using water and detergents and using a mechanical operation, drying machines which dry wet laundry using a heater and using a mechanical operation, and washing/drying machines into which washing machines and drying machines are incorporated.

A conventional washing machine includes a cabinet which defines the exterior of the washing machine, a tub which is disposed in the cabinet, a drum which is disposed in the tub and can load laundry therein, a motor which rotates the drum, a water supply unit which supplies wash water into the tub, and a water discharge unit which discharges wash water from the tub.

The water supply unit includes a water supply valve which controls the supply of water into the tub from an external source. The water discharge unit includes a water discharge pump which pumps out water in the tub.

When laundry is put into the drum and a detergent and wash water are supplied into the tub by the water supply unit, the motor begins to rotate, and thus, a washing operation begins. When the washing operation is completed, the motor stops rotating, and a discharge operation is performed by discharging polluted water in the tub with the use of the water discharge unit. During the discharge operation, the water discharge pump discharges water from the tub by pumping out water in the tub.

However, when a user temporarily terminates the discharge of water from the tub or when the conventional washing machine is turned off during the discharge of water from the tub and thus the water discharge pump stops operating, water may be continuously discharged from the tub due to a siphon phenomenon. As a result of the siphon phenomenon, the discharge of water from the tub continues even after the conventional washing machine resumes its operation and the supply of water into the tub begins, thereby resulting in wasted water and prolonged water discharge/wash time.

SUMMARY OF THE INVENTION

The present invention provides a method of controlling a laundry treatment device in which the waste of energy and wash time can be minimized by detecting a siphon phenomenon in advance.

According to an aspect of the present invention, there is provided a method of controlling a laundry treatment machine, the method including performing an intermittent water supply operation by repeatedly opening and closing one or more water supply valves a predefined number of times; detecting a variation in a water level in a tub during the intermittent water supply operation; and if the result of the detection indicates that the water level in the tub has been uniform or has decreased, discharging water from the tub by closing the water supply valves and by turning on a water discharge pump.

The performing the intermittent water supply operation, comprises controlling the water supply valves so that the water supply valves can stay open longer than they are closed.

The water supply valves may include a water supply valve for a pre-washing operation and a water supply valve for a main washing operation, and the performing the intermittent water supply operation, may include controlling the use of the water supply valve for a pre-washing operation.

If the result of the detection indicates that the water level in the tub has increased, the method may also include closing the water supply valve for a pre-washing operation and opening the water supply valve for a main washing operation.

If the result of the detection indicates that the water level in the tub has increased, the method may also include performing an operation requested by a user.

The method may also include performing the operation requested by the user after the discharge.

According to another embodiment of the present invention, there is provided a method of controlling a laundry treatment machine, the method including performing an intermittent water supply operation by repeatedly opening and closing one or more water supply valves a predefined number of times; primarily detecting a variation in a water level in a tub during the intermittent water supply operation; if the result of the primary detection indicates that the water level in the tub has been uniform or has decreased, performing a continuous water supply operation by maintaining the water supply valves to be open for a predefined amount of time; secondarily detecting a variation in the water level in the tub during the continuous water supply operation; and if the result of the secondary detection indicates that the water level in the tub has increased, discharging water from the tub by closing the water supply valves and by turning on a water discharge pump.

If the result of the secondary detection indicates that the water level in the tub has been uniform or has decreased, the method may also include determining that a water supply failure has occurred.

The method may also include returning to the performing the intermittent water supply operation, after the discharge.

The water supply valves may include a water supply valve for a pre-washing operation and a water supply valve for a main washing operation, and the performing the intermittent water supply operation or the performing the continuous water supply operation, may include controlling the use of the water supply valve for a pre-washing operation.

If the result of the primary detection indicates that the water level in the tub has increased, the method may also include closing the water supply valve for a pre-washing operation and opening the water supply valve for a main washing operation.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

For convenience, assume that a laundry treatment machine is a drum-type washing machine.

Figure 1:
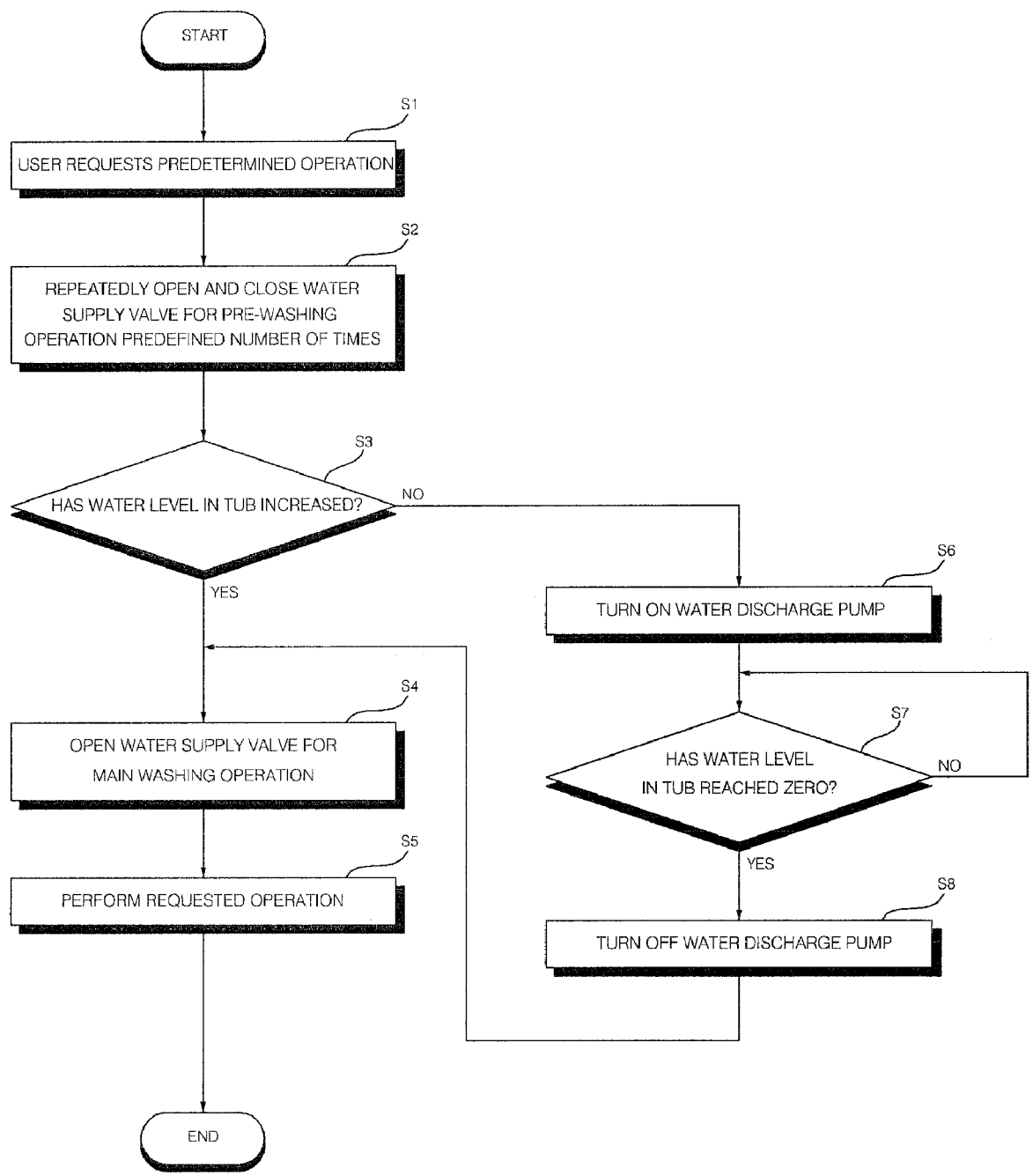
FIG. 1 is a flowchart illustrating a method of controlling a drum-type washing machine according to an embodiment of the present invention.

FIG. 1 is a flowchart illustrating a method of controlling a drum-type washing machine according to an embodiment of the present invention. Referring to FIG. 1, power is applied to a drum-type washing machine, and a user issues a request for performing a predetermined operation to the drum-type washing machine (S1). Then, a control unit of the drum-type washing machine performs an intermittent water supply operation so that a water supply valve for a pre-washing operation can be repeatedly opened and closed a predefined number of times (S2).

The drum-type washing machine may include a water supply valve for a main washing operation, the water supply valve for a pre-washing operation, and a water supply valve for a fabric softner. The water supply valve for a main washing operation is connected to a detergent inlet for a main washing operation via a hose, the water supply valve for a pre-washing operation is connected to a detergent inlet for a pre-washing operation via a hose, and the water supply valve for a fabric softner is connected to a fabric softner inlet via a hose.

Therefore, when the opening of the water supply valve for a main washing operation is controlled, wash water and a detergent are supplied. Therefore, during the intermittent water supply operation, the opening of the water supply valve for a pre-washing operation is controlled so as to minimize the waste of a detergent.

Also, during the intermittent water supply operation, the opening of the water supply valve for a pre-washing operation may be controlled so that the amount of wash water supplied during the intermittent water supply operation can become the same as or less than the amount of wash water discharged during the intermittent water supply operation due to a siphon phenomenon. In general, the speed of water being discharged due to a siphon phenomenon is lower than the speed of water being supplied. Thus, the water supply valve for a pre-washing operation may be controlled so that the water supply valve for a pre-washing operation can stay open longer than it is closed. For example, the water supply valve for a pre-washing operation may stay open for three seconds so that water can be supplied into a tub of the drum-type washing machine. Then, the water supply valve for a pre-washing operation may stay closed for five seconds so that the supply of water into the tub can be stopped. The water supply valve for a pre-washing operation may be repeatedly opened and closed six times in the above-mentioned manner.

During the intermittent water supply operation, it is determined whether the water level in the tub has increased (S3).

If it is determined in operation S3 that the water level in the tub has increased, it is determined that the intermittent water supply operation does not include the discharge of water but only includes the supply of water. Also, it is determined that no siphon phenomenon has occurred. Thus, the water supply valve for a pre-washing operation is opened, and the operation requested by the user is performed. If the operation requested by the user requires the supply of water, the water supply valve for a main washing operation may be opened so that water can be supplied into by the water supply valve for a main washing operation (S4). When the supply of water is completed, the operation requested by the user is performed (S5).

On the other hand, if it is determined in operation S3 that the water level in the tub has been uniform or has decreased, it appears that the amount of water supplied during the intermittent water supply operation is the same as or greater than the amount of water discharged during the intermittent water supply operation. Thus, it is determined that a siphon phenomenon has occurred. More specifically, when the amount of water supplied during the intermittent water supply operation is the same as the amount of water discharged during the intermittent water supply operation, the water level in the tub does not vary but is uniform. On the other hand, when the amount of water supplied during the intermittent water supply operation is less than the amount of water discharged during the intermittent water supply operation, the water level in the tub decreases.

Therefore, when the water level in the tub is uniform or decreases, it may be determined that a siphon phenomenon has occurred.

Once it is determined that a siphon phenomenon has occurred, the control unit turns on a water discharge pump so that water can be discharged from the tub until the water level in the tub reaches zero (S6). Once the water level in the tub reaches zero, no siphon phenomenon occurs any more.

Therefore, the water discharge pump is turned off, and the discharge of water is terminated (S8). Thereafter, the operation requested by the user is performed.

According to the embodiment of FIG. 1, it is possible to detect a siphon phenomenon before performing an operation requested by the user, by performing an intermittent water supply operation and detecting a variation in the water level in the tub. Also, it is possible to prevent the waste of water and minimize the amount of time taken to supply water and the amount of time taken to perform a washing operation by preventing wash water from being discharged due to a siphon phenomenon. Also, it is possible to prevent the waste of a detergent by using a water supply valve for a pre-washing operation to supply water for detecting a siphon phenomenon.

Figure 2:
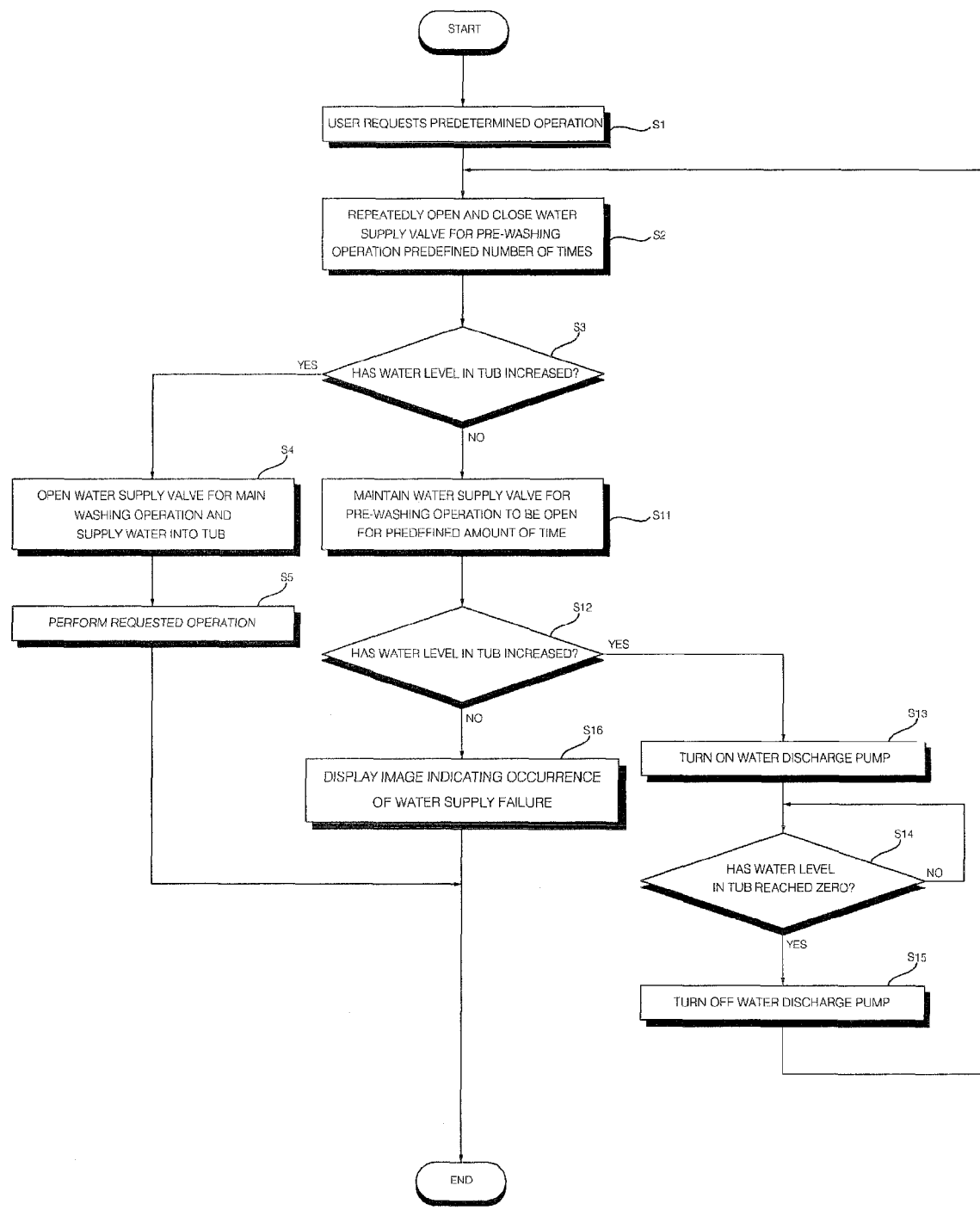
FIG. 2 is a flowchart illustrating a method of controlling a drum-type washing machine according to another embodiment of the present invention.

FIG. 2 is a flowchart illustrating a method of controlling a washing machine according to an embodiment of the present invention. Referring to FIG. 1, a user issues a request for performing a predetermined operation to a drum-type washing machine (S1). Then, an intermittent water supply operation is performed by repeatedly controlling the opening of a water supply valve for a pre-washing operation a predefined number of times (S2); a variation, if any, in the water level in a tub of the drum-type washing machine is primarily detected (S3); water is supplied into the tub by opening a water supply valve for a main washing operation (S4) if an increase in the water level in the tub is detected in operation S3; and the operation requested by the user is performed (S5). Operations S2 through S5 are the same as their respective counterparts of the embodiment of FIG. 1, and thus, detailed descriptions thereof will be skipped.

Referring to FIG. 2, if it is determined in operation S3 that the water level in the tub has been uniform or has decreased, a continuous water supply operation is performed by maintaining the water supply valve for a pre-washing operation to be open for a predefined amount of time (S11). As a result, water is continuously supplied into the tub. During the continuous water supply operation, the water supply valve for a pre-washing operation may stay open for three seconds.

During the continuous water supply operation, a variation, if any, in the water level in the tub is secondarily detected (S12). In general, the speed of water being discharged due to a siphon phenomenon is lower than the speed of water being supplied. Thus, if water is continuously supplied into the tub by performing the continuous water supply operation, the water level in the tub increases regardless of a siphon phenomenon.

Therefore, if an increase in the water level in the tub is detected in operation S12, the water supply valve for a pre-washing operation is closed so that the supply of water can be terminated. Thereafter, in order to prevent a siphon phenomenon, a water discharge pump of the drum-type washing machine is turned on so that water can be discharged from the tub (S13). It is possible to prevent a siphon phenomenon by discharging all the wash water in the tub. Thereafter, it is determined whether the water level in the tub has reached zero (S14). If it is determined in operation S14 that the water level in the tub has not yet reached zero, the discharge of water from the tub continues.

If it is determined in operation S14 that the water level in the tub has reached zero, the water discharge pump is turned off (S15), and the method returns to operation S2.

On the other hand, if it is determined in operation S12 that the water level in the tub has not increased, it is determined that a water supply failure has occurred (S15). Thereafter, a message indicating the occurrence of a water supply failure is displayed to the user (S16).

According to the embodiment of FIG. 2, it is possible to precisely detect a siphon phenomenon and to prevent a water supply failure from being mistaken as a siphon phenomenon by performing a continuous water supply operation and performing a water level detection operation twice.

Referring to FIG. 2, the method returns to operation S2 after operation S15 in which the discharge of water is terminated. However, the present invention is not restricted to this. In other words, after operation S15, the operation requested by the user may be readily performed.

As described above, according to the present invention, it is possible to detect a siphon phenomenon, before performing an operation requested by a user, by performing an intermittent water supply operation and detecting a variation, if any, in the water level in a tub of a washing machine. Therefore, it is possible to prevent wash water from being discharged due to a siphon phenomenon, to prevent the waste of water, and to minimize the amount of time taken to discharge water and the amount of time taken to perform a washing operation. In addition, according to the present invention, it is possible to prevent the waste of a detergent by using a water supply valve for a pre-washing operation to detect a siphon phenomenon.

Moreover, it is possible to prevent a water supply failure from being mistaken as a siphon phenomenon and precisely detect a siphon phenomenon by maintaining a water supply valve to be open for a predefined amount of time and then detecting a variation, if any, in the water level in a tub if the water level in a tub has been uniform or has been decreased since an intermittent water supply operation.

What is claimed is:

1. A method of controlling a laundry treatment machine, the method comprising:
    performing an intermittent water supply operation, comprising repeatedly opening and closing one or more water supply valves a predefined number of times; and
    detecting that a water level in a tub is uniform or has decreased based on a comparison of a current water level and a previous water level in the tub during the intermittent water supply operation, and closing the one or more water supply valves and turning on a water discharge pump and discharging water from the tub.

2. The method of claim 1, wherein the performing the intermittent water supply operation comprises alternately and repeatedly opening the one or more water, supply valves for a first period of time and then closing the one or more water supply valves for a second period of time that is shorter than the first period of time.

3. The method of claim 1, wherein the one or more water supply valves comprise a first water supply valve for a pre-washing operation and a second water supply valve for a main washing operation, and wherein performing the intermittent water supply operation comprises controlling an opening and closing of the first water supply valve.

4. The method of claim 3, further comprising detecting that a water leveling the tub has increased based on a comparison of a current water level and a previous water level in the tub during the intermittent water supply operation, and closing the first water supply valve and opening the second water supply valve.

5. The method of claim 1, wherein, if the comparison indicates that the water level in the tub has increased, the method further comprises performing a requested laundry treatment operation.

6. The method of claim 1, wherein discharging water from the tub comprises keeping the water discharge pump on until the water level in the tub reaches zero.

7. The method of claim 1, further comprising resuming the intermittent water supply operation after discharging water from the tub.

8. The method of claim 1, further comprising performing a requested laundry treatment operation after discharging water from the tub.

9. A method of controlling a laundry treatment machine, the method comprising:
    alternately and repeatedly opening and closing one or more supply valves to intermittently supply washing fluid to a tub; and
    determining that a fluid level in the tub has decreased or remained the same, and closing the one or more supply valves and turning on a discharge pump to discharge washing fluid from the tub, turning off the discharge pump when the fluid level in the tub reaches zero, and thereafter continuously supplying fluid to the tub to a predetermined washing level and performing a requested washing operation.

10. The method of claim 9, further comprising:
    determining that the fluid level in the tub has increased, and continuously supplying fluid to the tub to the predetermined washing level and performing the requested washing operation.

11. The method of claim 9, wherein alternately and repeatedly opening and closing one or more supply valves to intermittently supply washing fluid to a tub comprises alternately and repeatedly opening and closing one or more supply valves to intermittently supply washing fluid to a tub a predetermined number of times, and determining whether a fluid level in the tub has increased, decreased or remained the same after the one or more supply valves have been alternately and repeatedly opened and closed the predetermined number of times.

* * * * *